(12) United States Patent
Kato

(10) Patent No.: US 11,175,865 B2
(45) Date of Patent: Nov. 16, 2021

(54) INFORMATION PROCESSING APPARATUS AND NON-TRANSITORY COMPUTER READABLE MEDIUM STORING PROGRAM

(71) Applicant: FUJIFILM BUSINESS INNOVATION CORP., Tokyo (JP)

(72) Inventor: Nobutaka Kato, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/899,161

(22) Filed: Jun. 11, 2020

(65) Prior Publication Data
US 2021/0173597 A1 Jun. 10, 2021

(30) Foreign Application Priority Data
Dec. 6, 2019 (JP) .............................. JP2019-221022

(51) Int. Cl.
*G06F 3/12* (2006.01)
*H04N 1/32* (2006.01)

(52) U.S. Cl.
CPC .......... *G06F 3/1209* (2013.01); *G06F 3/1205* (2013.01); *G06F 3/1232* (2013.01); *H04N 1/32096* (2013.01)

(58) Field of Classification Search
None
See application file for complete search history.

(56) References Cited

U.S. PATENT DOCUMENTS

| | | | |
|---|---|---|---|
| 6,336,215 B1 * | 1/2002 | Oberhauser | G06F 8/656 717/129 |
| 8,219,597 B2 * | 7/2012 | Igarashi | G06F 16/258 707/809 |
| 2001/0046157 A1 * | 11/2001 | Haraguchi | G11C 16/102 365/185.08 |
| 2018/0039461 A1 * | 2/2018 | Wakasa | G06F 3/1254 |
| 2019/0108345 A1 * | 4/2019 | Shiomi | G06F 21/57 |

FOREIGN PATENT DOCUMENTS

JP 2009-140337 A 6/2009

* cited by examiner

Primary Examiner — Dov Popovici
(74) Attorney, Agent, or Firm — Oliff PLC

(57) ABSTRACT

An information processing apparatus includes: a memory; and a processor configured to receive setting data that is used for an operation of the information processing apparatus, and upon a determination that the received setting data is formatted according to an old specification and the information processing apparatus has no setting data registered, convert and store the received setting data in a new format in the memory.

7 Claims, 17 Drawing Sheets

FIG. 2

| MANAGEMENT NUMBER | DESTINATION NAME | FAX NUMBER | MAIL ADDRESS |
|---|---|---|---|
| 0001 | AAA CORPORATION, SALES FIRST DIVISION | 03-1234-5678 | aaa@abcdefg.co.jp |
| 0002 | BB TRADING (INC.), ACCOUNTING DEPARTMENT | 045-111-2222 | abcd@aaasho-ji.co.jp |
| 0003 | ABCD CORPORATION, MR. CC | 03-4321-8765 | fuji@ABCD.co.jp |
| 0004 | DD CORPORATION, SALES DEPARTMENT | 03-3333-4444 | hanbai@xyz.co.jp |
| 0005 | EEE (INC.), SALES DEPARTMENT | 045-888-9999 | eigyo@abcxyz.com |

FIG. 3

STRUCTURE OF DESTINATION DATA
(OLD SPECIFICATIONS)

| ATTRIBUTE | SPECIFICATIONS |
|---|---|
| MANAGEMENT NUMBER | 4 DIGIT |
| DESTINATION NAME | MAXIMUM 52 CHARACTERS |
| A FUNCTION | SUPPORTED |
| B FUNCTION | NOT SUPPORTED |
| C FUNCTION | SUPPORTED |

STRUCTURE OF DESTINATION DATA
(NEW SPECIFICATIONS)

| ATTRIBUTE | SPECIFICATIONS |
|---|---|
| MANAGEMENT NUMBER | 6 DIGIT |
| DESTINATION NAME | MAXIMUM 128 CHARACTERS |
| A FUNCTION | NOT SUPPORTED |
| B FUNCTION | SUPPORTED |
| C FUNCTION | SUPPORTED |

FIG. 7

| MANAGEMENT NUMBER (4 DIGIT) | DESTINATION NAME (MAXIMUM 52 CHARACTERS) |
|---|---|
| 0001 | AAAA CORPORATION, YOKOHAMA OFFICE, SALES DEPARTMENT, |
| 0002 | BBBB CORPORATION, PLANNING AND DEVELOPMENT DEPARTMENT, ACCOUNTING PERSONNEL |

⇒ WRITING ACCORDING TO OLD SPECIFICATIONS

| MANAGEMENT NUMBER (6 DIGIT) | DESTINATION NAME (MAXIMUM 128 CHARACTERS) | | |
|---|---|---|---|
| 000001 | AAAA CORPORATION, YOKOHAMA OFFICE, SALES DEPARTMENT, | | |
| 000002 | BBBB CORPORATION, PLANNING AND DEVELOPMENT DEPARTMENT, ACCOUNTING PERSONNEL | | |

FIG. 10

| TYPE OF OPERATION MODE | OPERATIONAL DETAILS |
|---|---|
| INITIAL REGISTRATION MODE | OPERATION MODE WHICH PERMITS REGISTRATION OF DESTINATION DATA ACCORDING TO BOTH IFS OF OLD SPECIFICATION IF AND NEW SPECIFICATION IF |
| RESTRICTION MODE | OPERATION MODE WHICH PROHIBITS REGISTRATION OF DESTINATION DATA ACCORDING TO OLD SPECIFICATION IF, AND ONLY PERMITS REGISTRATION OF DESTINATION DATA ACCORDING TO NEW SPECIFICATION IF |

INFORMATION PROCESSING APPARATUS AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2019-221022 filed on Dec. 6, 2019.

BACKGROUND

(i) Technical Field

The present disclosure relates to an information processing apparatus and a non-transitory computer readable medium storing a program.

(ii) Related Art

Japanese Unexamined Patent Application Publication No. 2009-140337 discloses an information processing method that, when transferring data between pieces of software in different versions, obtains management information in a format compatible with old version software in an information processing apparatus in which new version software runs, converts the obtained management information according to a format compatible with the new version software, and thereby enables appropriate data transfer specifically for the new version software without impairing the convenience of users.

SUMMARY

Aspects of non-limiting embodiments of the present disclosure relate to an information processing apparatus and a non-transitory computer readable medium storing a program that are capable of enabling transfer of old specification-compliant setting data to an apparatus which is operated using new specification-compliant setting data, and preventing the occurrence of a problem in registered new specification-compliant setting data.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including: a memory; and a processor configured to receive setting data that is used for an operation of the information processing apparatus, and upon a determination that the received setting data is formatted according to an old specification and the information processing apparatus has no setting data registered, convert and store the received setting data in a new format in the memory.

BRIEF DESCRIPTION OF THE DRAWINGS

Exemplary embodiment of the present disclosure will be described in detail based on the following figures, wherein:

FIG. 2 is a table illustrating an example of destination date used in the exemplary embodiment of the present disclosure;

FIG. 3 is a chart illustrating examples of the structure of old specification-compliant destination data and the structure of new specification-compliant destination data;

FIG. 7 is a chart illustrating the manner in which old specification-compliant destination data retrieved from new specification-compliant destination data is registered again in the image forming apparatus;

FIG. 10 is a table for illustrating the type set as an operation mode at the time of registration of destination data in the exemplary embodiment of the present disclosure;

DETAILED DESCRIPTION

Next, an exemplary embodiment of the present disclosure will be described with reference to the drawings.

Figure 1:
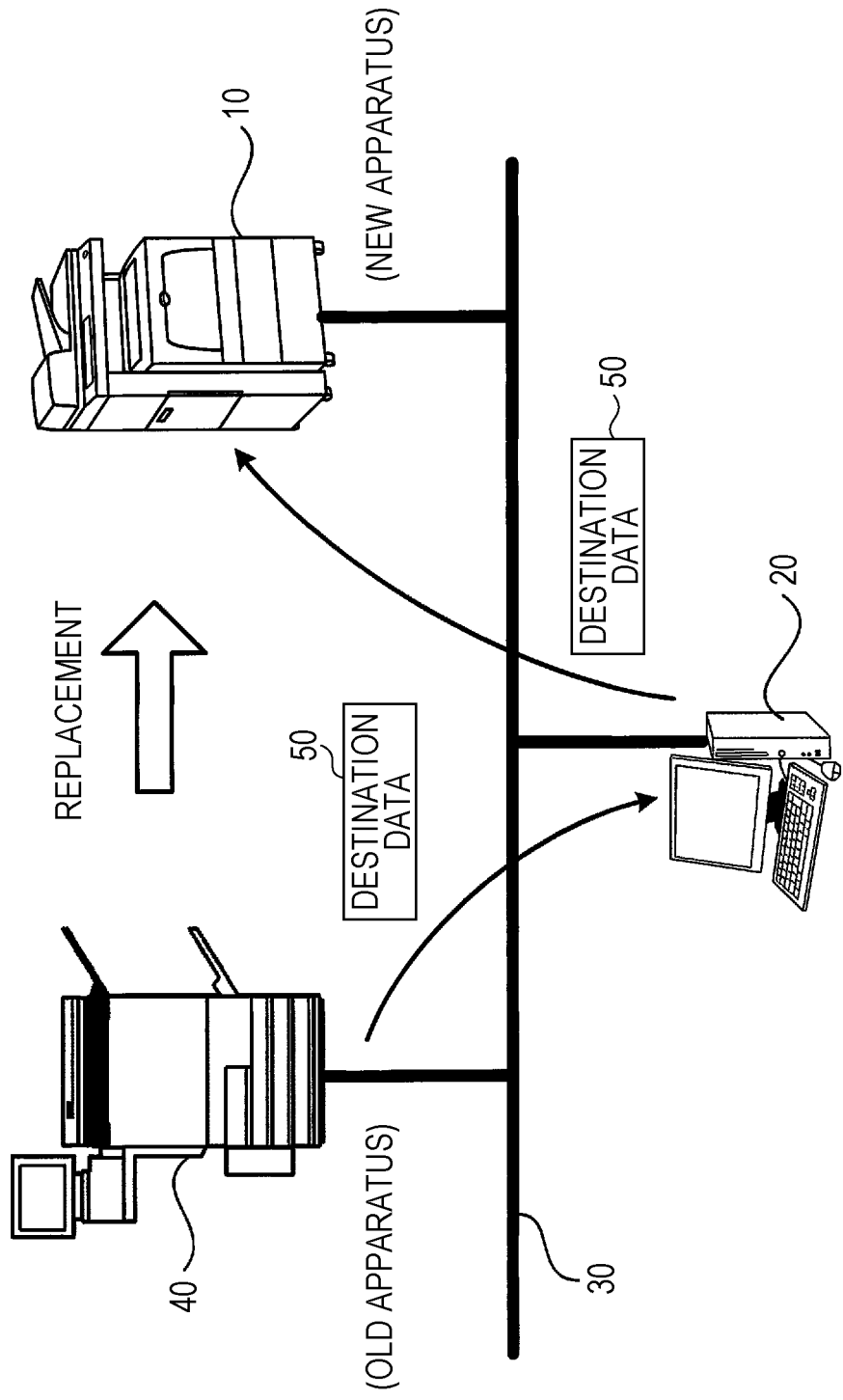
FIG. 1 is a diagram illustrating the system configuration of an image forming system in an exemplary embodiment of the present disclosure.

FIG. 1 illustrates the configuration of an image forming system in an exemplary embodiment of the present disclosure.

As illustrated in FIG. 1, the image forming system in the exemplary embodiment of the present disclosure has a configuration in which image forming apparatuses 10, 40 and a terminal apparatus 20 are connected to each other via a network 30.

The image forming apparatuses 10, 40 are each a device so-called multifunctional device having multiple functions such as a print function, a scan function, a copy function, and a facsimile function.

In the exemplary embodiment, description is given using an example in which a user replaces the image forming apparatus 40 used so far with the new image forming apparatus 10. Hereafter, the image forming apparatus 40 used by a user so far may be called the old apparatus, and the image forming apparatus 10 newly purchased may be called the new apparatus.

As illustrated in FIG. 1, when an image forming apparatus is replaced, a user needs to perform various settings to the newly purchased image forming apparatus 10. However, it is troublesome to input setting values for various setting items by a manual operation. Thus, when the setting details in the image forming apparatus 40 used so far are desired to be passed as they are in the image forming apparatus 10, the setting details in the image forming apparatus 40 are exported as setting data, the setting data is imported into the image forming apparatus 10, and thus the setting details are reflected.

In the exemplary embodiment below, as an example, a case is described in which, of the setting data used at the time of operation of an apparatus, the destination data configured by destination information used at the time of FAX transmission is transferred from the image forming apparatus 40 as an old apparatus to the image forming apparatus 10 as a new apparatus.

Specifically, as illustrated in FIG. 1, destination data 50 stored in the image forming apparatus 40 as an old apparatus is once read by the terminal apparatus 20, and the read destination data 50 is registered from the terminal apparatus 20 in the image forming apparatus 10 as a new apparatus.

An example of such destination data 50 is illustrated in FIG. 2. The destination data illustrated in FIG. 2 is configured by multiple pieces of destination information including various information, such as a management number for managing individual destination information, a destination name, a FAX number, and a mail address.

When the specifications of the destination data of the old apparatus are the same as the specifications of the destination data of the new apparatus, the destination data exported from the old apparatus may be imported into the new apparatus as it is.

However, when the types of the apparatuses are different, the specifications of the destination data may be different. For instance, a situation may occur in which old specification-compliant destination data is used in the old apparatus, and new specification-compliant destination data different from old specifications is used in the new apparatus. In this case, the old specification-compliant destination data retrieved from the old apparatus cannot be registered as it is in the new apparatus.

FIG. 3 illustrates an example of the structure of such old specification-compliant destination data and the structure of new specification-compliant destination data.

Referring to FIG. 3, it is seen that the management number in the old specification-compliant destination data is 4 digits, whereas the management number in the new specification-compliant destination data is 6 digits. In addition, the destination name in the old specification-compliant destination data is a maximum of 52 characters, whereas the destination name in the new specification-compliant destination data is a maximum of 128 characters. Additionally, a function may be supported or not supported depending on the old specifications and the new specifications.

For instance, in the old specifications, wild card specification is possible when destination information is specified by a management number, but such a specification method may not be supported in the new specifications. Specifically, the old specifications support the function of, upon receiving specification of "001*" for management numbers, performing transmission processing for 10 management numbers "0010" to "0019", however, such a specification method may not be supported in the new specifications.

When the data structures of the old specifications and the new specifications are different like this, in order to import the old specification-compliant destination data, exported from the old apparatus, into the new apparatus that uses new specification-compliant destination data, the old specification-compliant destination data needs to be converted to new specification-compliant destination data.

Figure 4:
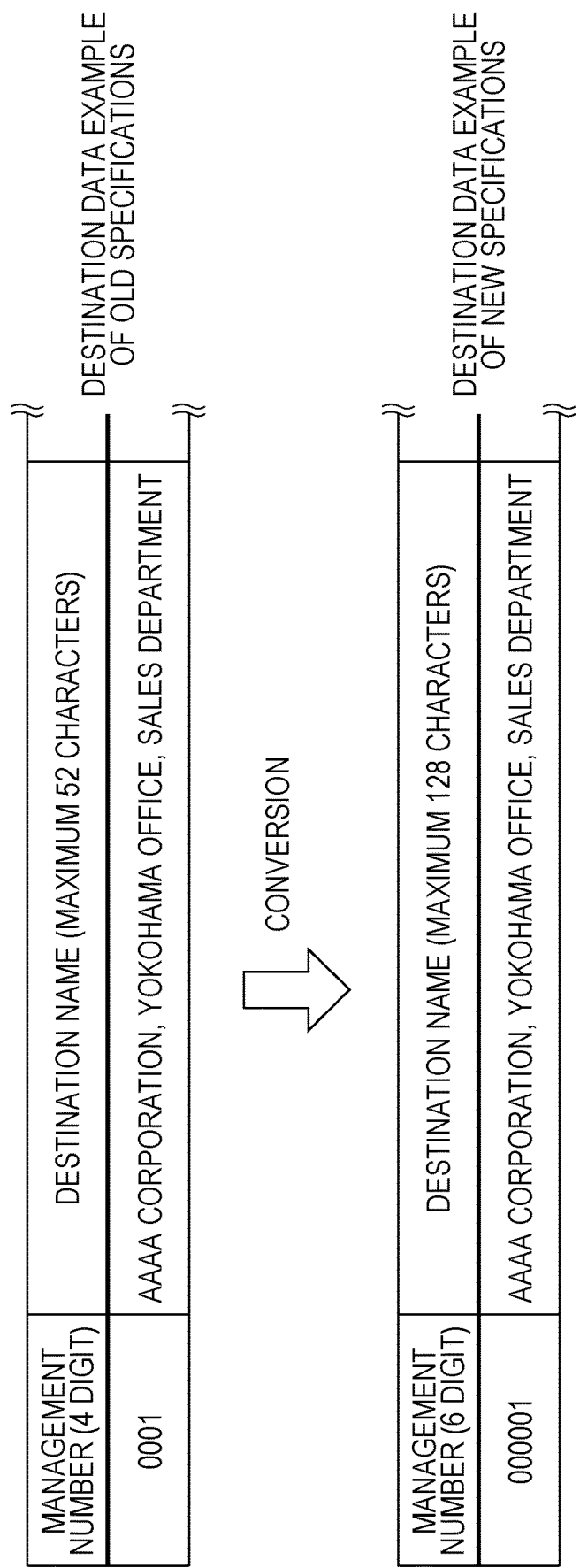
FIG. 4 is a chart illustrating an example of conversion from old specification-compliant destination data to new specification-compliant destination data.

FIG. 4 illustrates an example of conversion from the old specification-compliant destination data to new specification-compliant destination data in such a case.

In FIG. 4, the management number in the old specifications is 4 digits, whereas the management number in the new specifications is 6 digits. Thus, it is seen that a 4-digit management number "0001" is appended by "00" at the fifth and sixth places and is converted to a 6-digit management number "000001".

In FIG. 4, the destination name in the old specifications is a maximum of 52 characters, whereas the destination name in the new specifications is a maximum of 128 characters. Thus, it is seen that the 52-character destination name is used as it is as the destination name in the new specifications.

When destination data is compliant with the old specifications, the apparatus that transmits and receives the destination data needs to be equipped with a communication interface (IF) for exchanging old specification-compliant destination data. When destination data is in compliant with the new specifications, the apparatus that transmits and receives the destination data needs to be equipped with a communication IF for exchanging new specification-compliant destination data.

The communication IF refers to a standard or specification for transmitting and receiving destination data to and from another apparatus. A communication IF for exchanging old specification-compliant destination data is simply called an old specification IF, and a communication IF for exchanging new specification-compliant destination data is simply called a new specification IF.

In order for an apparatus to transmit and receive old specification-compliant destination data, the apparatus needs to be provided with an old specification IF, and in order for an apparatus to transmit and receive new specification-compliant destination data, the apparatus needs to be provided with a new specification IF. In other words, when an apparatus exchanges old specification-compliant destination data with another apparatus, both apparatuses need to be provided with respective old specification IFs, and when an apparatus exchanges new specification-compliant destination data with another apparatus, both apparatuses need to be provided with respective new specification IFs.

Figure 5:
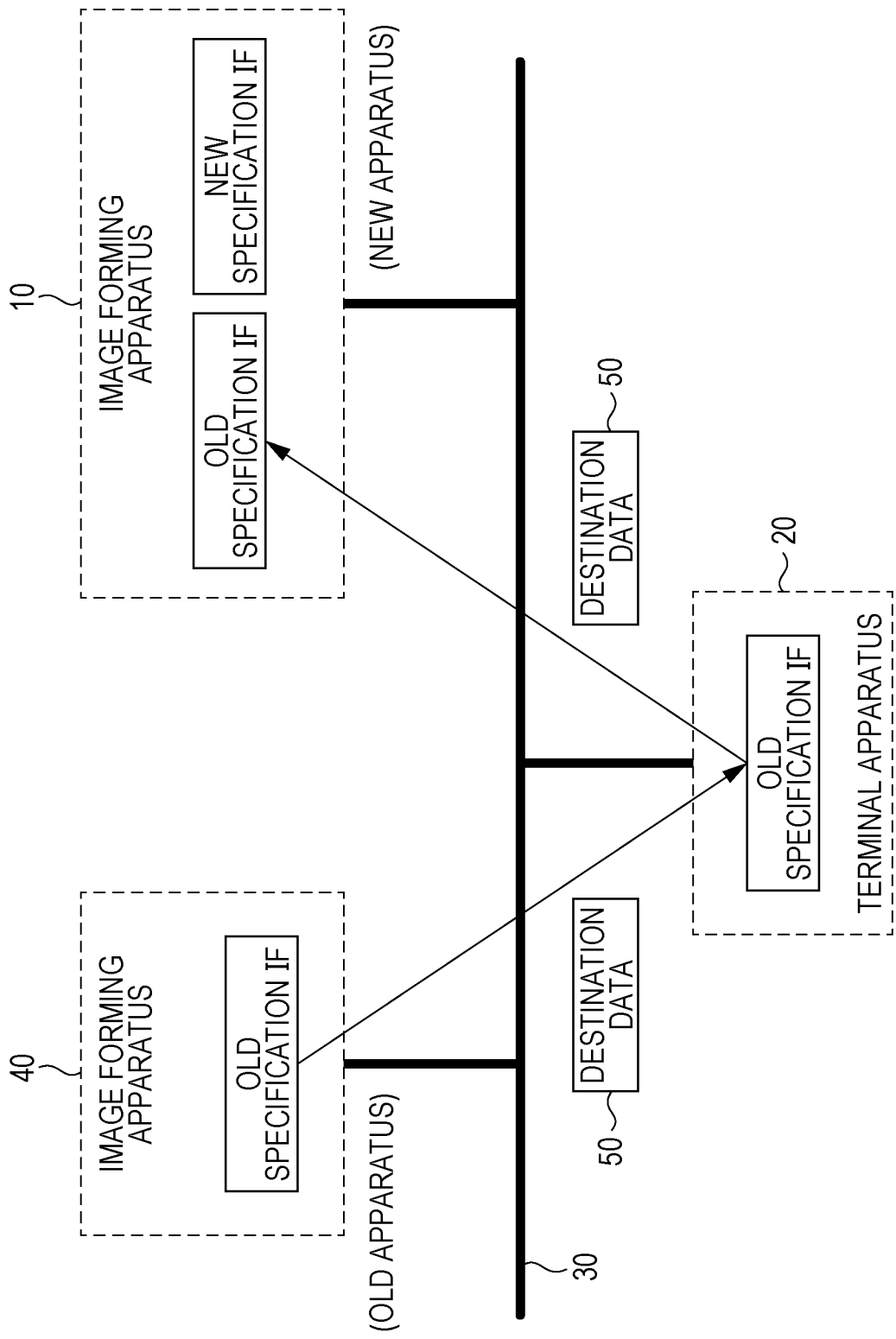
FIG. 5 is a diagram illustrating the type of communication IF provided in each of image forming apparatuses and a terminal apparatus.

FIG. 5 illustrates types of communication IF provided in the image forming apparatuses 10, 40 and the terminal apparatus 20.

Referring to FIG. 5, the image forming apparatus 40 and the terminal apparatus 20 as old apparatuses are each provided with an old specification IF. Thus, it is possible for the terminal apparatus 20 to read destination data from the image forming apparatus 40 as an old apparatus, edit the destination data, and register the edited destination data in the image forming apparatus 40 again.

Referring to FIG. 5, the image forming apparatus 10 as a new apparatus is configured to include both the new specification IF and the old specification IF. Adopting such a configuration allows the terminal apparatus 20 to retrieve the old specification-compliant destination data 50 from the image forming apparatus 40 as an old apparatus, and transfer and register the destination data 50 to the image forming apparatus 10 as a new apparatus.

However, when registration of old specification-compliant setting data is always allowed in the image forming apparatus 10 as a new apparatus, there is a possibility that a problem may occur in which already registered new specification-compliant setting data is overwritten or rewritten.

Figure 6:
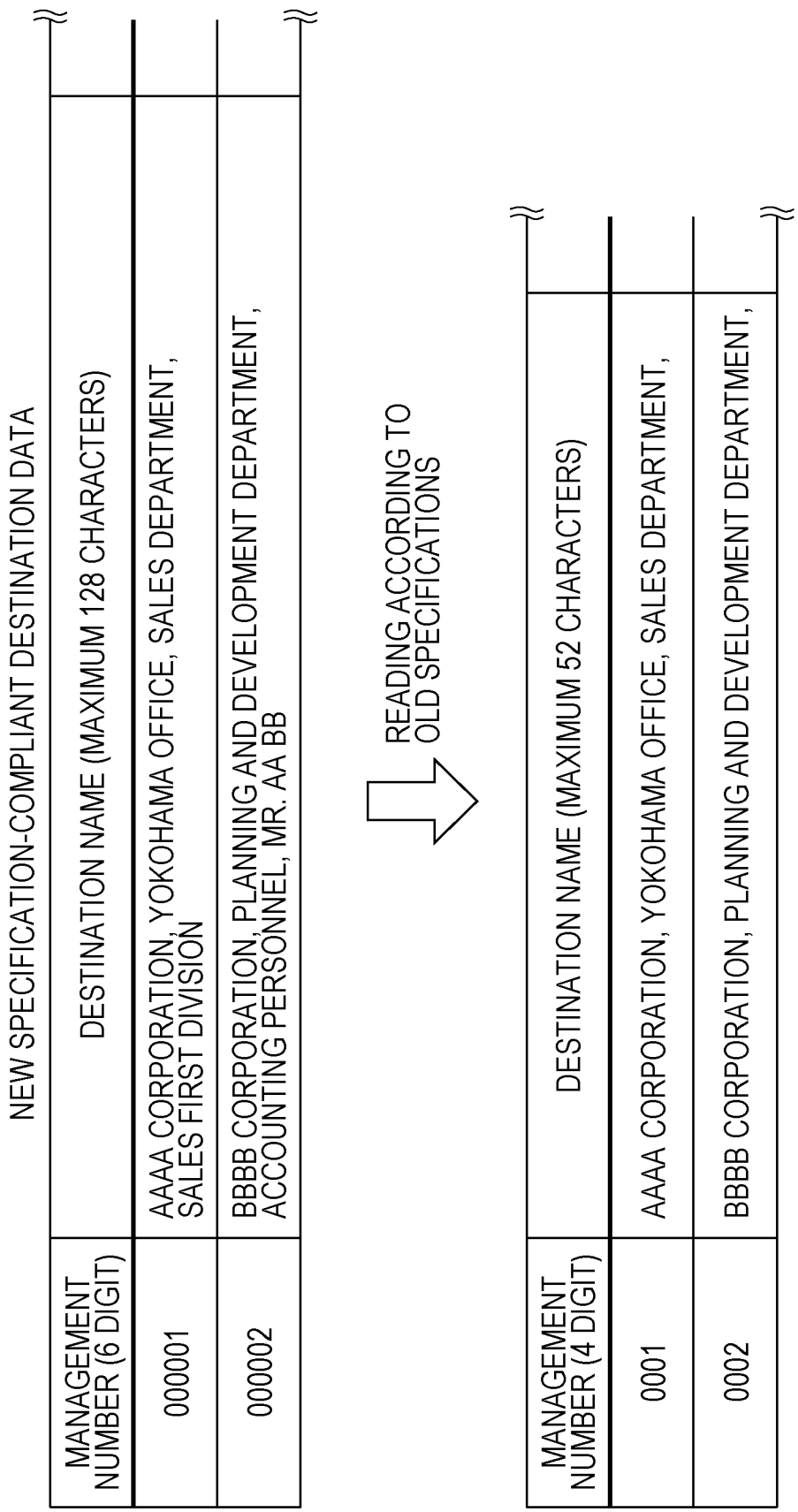
FIG. 6 is a chart illustrating the manner in which destination data is read from the image forming apparatus by the terminal apparatus.

FIG. 6 illustrates the manner in which the terminal apparatus 20 reads destination data from the image forming apparatus 10, for instance. When the terminal apparatus 20 reads new specification-compliant destination data from the image forming apparatus 10 via the new specification IF, the new specification-compliant destination data is converted to old specification-compliant destination data and read.

Thus, for instance, only 52 characters in a destination name having a maximum of 128 characters are to be retrieved as the destination name in old specification-compliant destination data.

FIG. 7 illustrates the manner in which the old specification-compliant destination data retrieved from the new specification-compliant destination data is registered again in the image forming apparatus 10. When the old specification-compliant destination data is registered in the image forming apparatus 10 which is compatible with the new specifications, the old specification-compliant destination data is converted to new specification-compliant destination data.

Thus, as illustrated in FIG. 7, "0" is appended to each of the fifth and sixth places of a 4-digit management number, and a destination name having a maximum of 52 characters is registered as a destination name having a maximum of 128 characters.

However, when the new specification-compliant destination data is retrieved as the old specifications, the number of digits of a management number is decreased, or the maximum number of characters of a destination name is decreased, thus, for instance, the destination name "AAAA CORPORATION, YOKOHAMA OFFICE, SALES DEPARTMENT, SALES FIRST DIVISION" is converted to "AAAA CORPORATION, YOKOHAMA OFFICE, SALES DEPARTMENT".

Thus, re-registration of the old specification-compliant destination data causes a problem such as partial deletion of a destination name. The example illustrated in FIG. 7 shows the case in which even though a destination name is not corrected, part of the destination name is deleted.

In order to prevent the occurrence of such a problem, it is sufficient that a new apparatus that handles new specification-compliant destination data be not provided with an old specification IF and not configured to receive registration of old specification-compliant destination data.

However, when registration of old specification-compliant setting data is not absolutely accepted, the old specification-compliant setting data cannot be transferred, which is inconvenient at the time of replacement of an image forming apparatus. Specifically, when destination data registered in an old apparatus cannot be transferred to a new apparatus, time and effort is needed such as re-registration of destination information pieces in the new apparatus one by one by a manual operation.

Thus, in the exemplary embodiment, the image forming apparatus 10 as a new apparatus is provided with the function as described below, thereby making it possible to transfer the old specification-compliant destination data 50 to the image forming apparatus 10 which is operated using the new specification-compliant destination data as well as to prevent the occurrence of a problem in the new specification-compliant destination data, already registered in the image forming apparatus 10.

Figure 8:
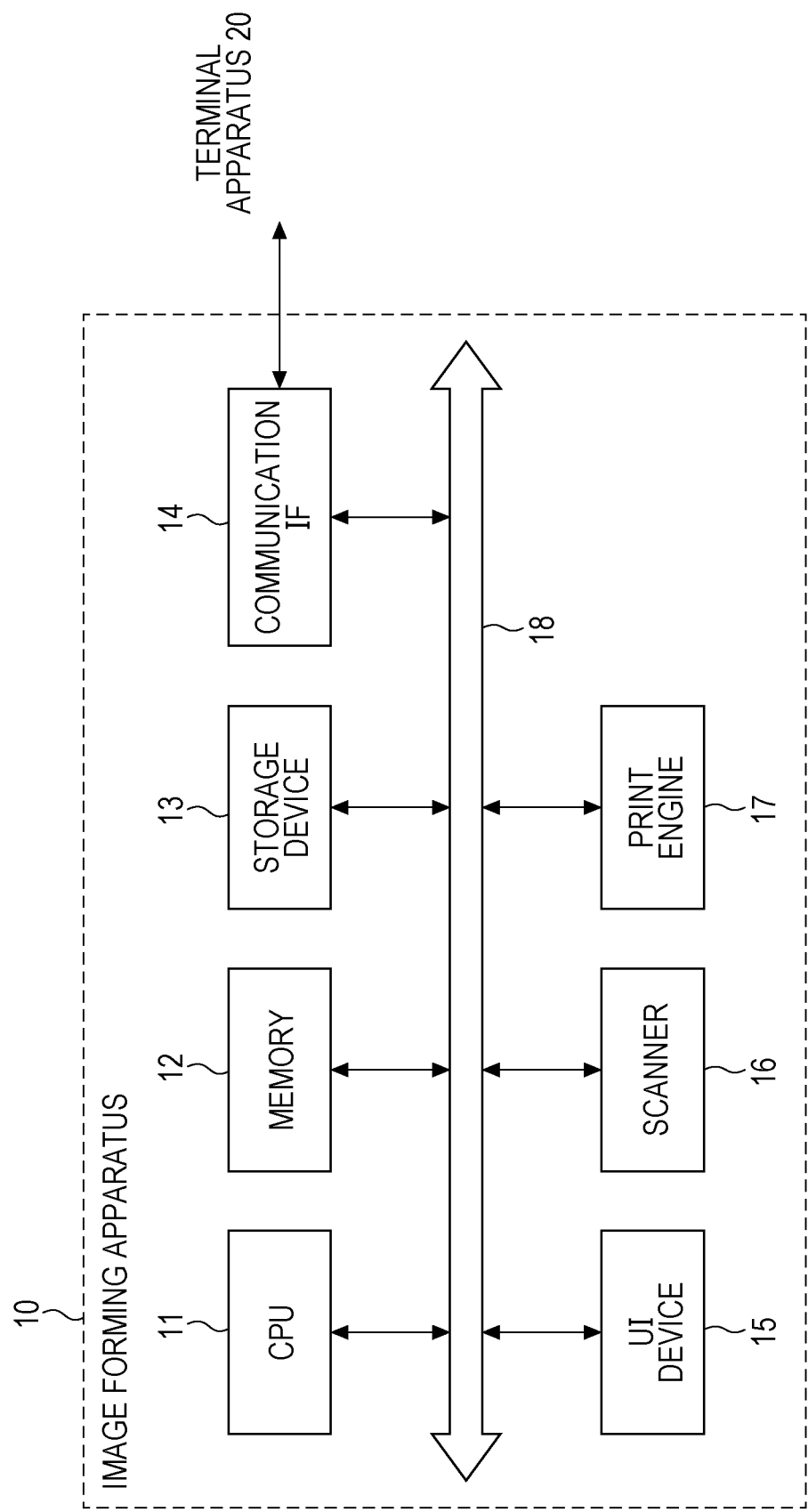
FIG. 8 is a block diagram illustrating the hardware configuration of the image forming apparatus in the exemplary embodiment of the present disclosure.

Next, FIG. 8 illustrates the hardware configuration of the image forming apparatus 10 in the image forming system of the exemplary embodiment.

As illustrated in FIG. 8, the image forming apparatus 10 has a CPU 11, a memory 12, a storage device 13 such as a hard disk drive, a communication interface (abbreviated as IF) 14 for transmitting and receiving data to and from an external apparatus via the network 30, a user interface (abbreviated as UI) device 15 including a touch panel or a liquid crystal display and a keyboard, a scanner 16, and a print engine 17. These constituent elements are connected to each other via a control bus 18.

The print engine 17 prints an image on a recording medium such as a sheet for printing through processes such as charging, exposure, development, transfer, and fixing.

The CPU 11 is a processor that controls the operation of the image forming apparatus 10 by performing predetermined processing based on a control program stored in the memory 12 or the storage device 13. In the exemplary embodiment, a description is given by assuming that the CPU 11 reads and executes the control program stored in the memory 12 or the storage device 13. However, it is also possible to provide the program to the CPU 11 by storing the program in a recording medium such as a CD-ROM.

Figure 9:
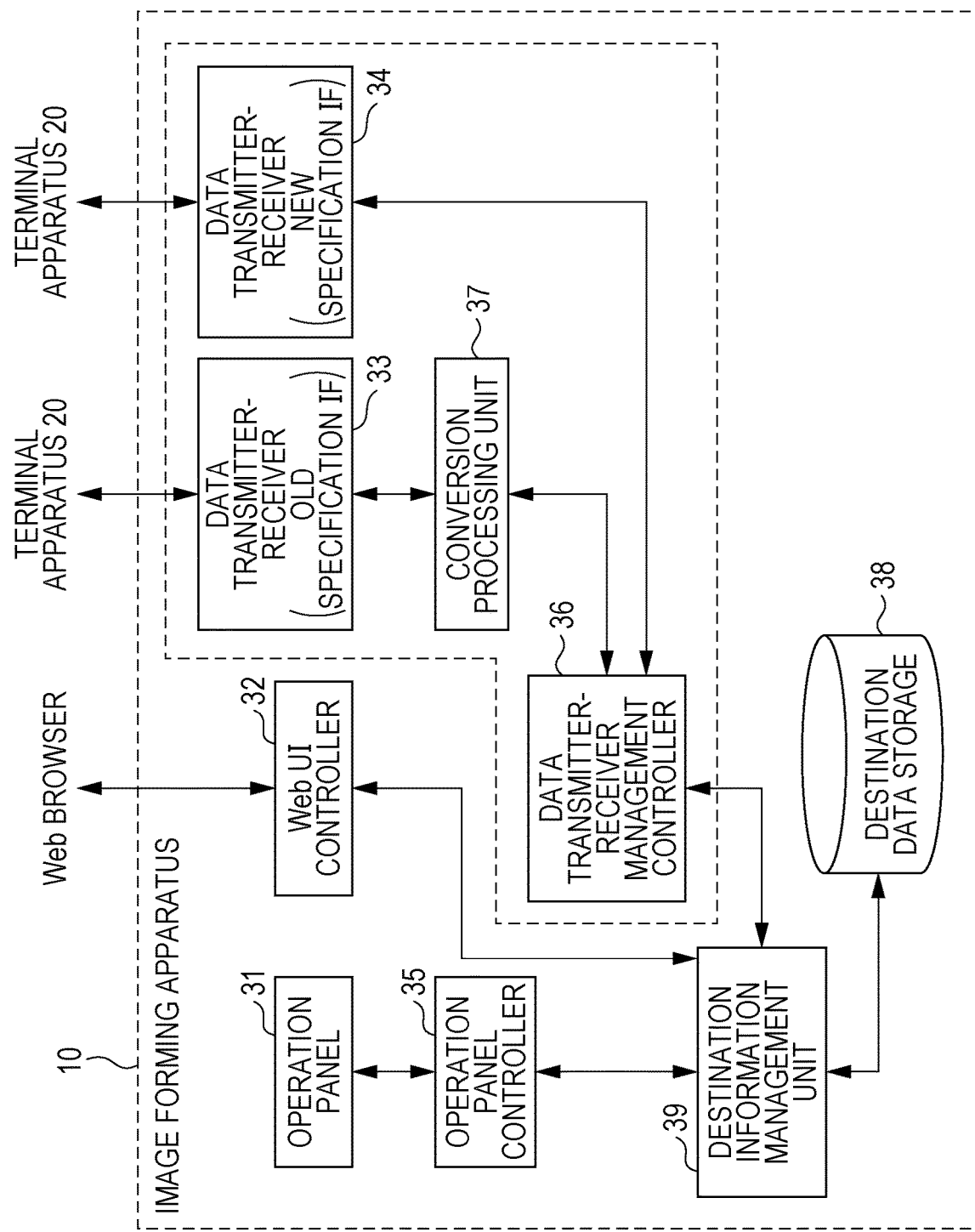
FIG. 9 is a block diagram illustrating the functional configuration of the image forming apparatus in the exemplary embodiment of the present disclosure.

FIG. 9 is a block diagram illustrating the functional configuration of the image forming apparatus 10 implemented by executing the above-mentioned control program. It is to be noted that in FIG. 9, an illustration is given in which only the functional configuration at the time of registration of destination data is shown, and the function for performing various processing such as printing, FAX, and scan is omitted.

As illustrated in FIG. 9, the image forming apparatus 10 in the exemplary embodiment includes an operation panel 31, a Web UI (abbreviation of Web user interface) controller 32, a data transmitter-receivers 33, 34, an operation panel controller 35, a data transmission-reception management controller 36, a conversion processing unit 37, a destination data storage 38, and a destination information management unit 39.

The destination data storage 38 stores destination data used at the time of FAX transmission.

The operation panel 31 receives an input of various operational information from a user. The operation panel controller 35 controls the operation panel 31.

The Web UI controller 32 provides a user interface function that, in response to access from an external apparatus via a Web browser, causes the operation screen for the image forming apparatus 10 to be displayed on the display of the external apparatus, and allows setting to the image forming apparatus 10 to be input.

The data transmitter-receiver 33 transmits and receives old specification-compliant destination data to and from an external apparatus, for instance, the terminal apparatus 20 via an old specification IF. The data transmitter-receiver 34 transmits and receives new specification-compliant destination data to and from an external apparatus, for instance, the terminal apparatus 20 via a new specification IF.

The conversion processing unit 37 performs processing to convert the old specification-compliant destination data received by the data transmitter-receiver 33 into new specification-compliant destination data, and to convert the new specification-compliant destination data read from the destination data storage 38 into old specification-compliant destination data.

The data transmission-reception management controller 36 controls the operation of the data transmitter-receivers 33, 34 and the conversion processing unit 37, and controls the destination data transmitted and received to and from an external apparatus such as the terminal apparatus 20. Specifically, the data transmission-reception management controller 36 performs control to store the destination data received by the data transmitter-receivers 33, 34 into the destination data storage 38 via the destination information management unit 39, to obtain the destination data stored in the destination data storage 38 through the destination information management unit 39, and to transmit the destination data to the external apparatus.

The destination information management unit 39 manages the destination data stored in the destination data storage 38. The destination information management unit 39 is a software library that performs an operation to the destination data storage 38. The operation panel controller 35, the Web UI controller 32, and the data transmission-reception management controller 36 edit the destination data stored in the destination data storage 38 via the destination information management unit 39.

Specifically, the destination information management unit 39 registers the destination data received from the external apparatus, and the destination data inputted via the operation panel 31 in the destination data storage 38 based on the instructions from the operation panel controller 35, the Web UI controller 32, and the data transmission-reception management controller 36.

It is designed that a user is allowed to read the destination data stored in the destination data storage 38 and view the details registered in the destination data. For instance, the operation panel controller 35 reads the destination data stored in the destination data storage 38 via the destination information management unit 39 and displays the destination data on the operation panel 31. In addition, it is designed that the Web UI controller 32 and the data transmission-reception management controller 36 are also able to read the destination data stored in the destination data storage 38 via the destination information management unit 39, and transmit the destination data to the external apparatus.

When receiving destination data to be registered in the destination data storage 38, and the received destination data is old specification-compliant destination data received via a transmission-reception specification in compliant with the old specifications, and registered destination data is not present in the apparatus, the data transmission-reception management controller 36 converts the received old specification-compliant destination data to new specification-compliant destination data by the conversion processing unit 37. The data transmission-reception management controller 36 stores the destination data converted to the new specifications by the conversion processing unit 37 in the destination data storage 38 through the destination information management unit 39.

Specifically, when destination data includes multiple pieces of destination information and even a single piece of registered destination information is not present in the apparatus, the data transmission-reception management controller 36 converts the old specification-compliant destination data to the new specifications by the conversion processing unit 37. Here, the destination information is individual data for destination data including multiple pieces of destination information.

Here, the data transmission-reception management controller 36 obtains information on the number of pieces of destination information registered in the destination data storage 38 through the destination information management unit 39, and determines whether or not even a single piece of destination information is not present in the destination data storage 38.

It is to be noted that the image forming apparatus 10 in the exemplary embodiment has a specification that allows multiple pieces of destination information included in the destination data to be processed continuously sequentially. Thus, when request for registration of a single piece of destination information and request for registration of the next piece of destination information are performed within a predetermined time, the data transmission-reception management controller 36 handles those pieces of destination data as a series of destination data, and when registered destination data is not present at the time of registration of the series of destination data, the data transmission-reception management controller 36 registers the series of destination data.

For instance, the data transmission-reception management controller 36 starts a timer after completion of registration of a single piece of destination information, and when the timer value of the timer at the time of receiving the next piece of destination information is less than or equal to a predetermined time, for instance when less than or equal to five seconds, the data transmission-reception management controller 36 handles the destination data with registration completed and the next destination data with a registration request received as a series of destination data.

Next, the operation of the image forming apparatus 10 in the exemplary embodiment will be described in detail with reference to the drawings.

The operational details of the operation mode at the time of registration of destination data in the image forming apparatus 10 will be described before the operation of the image forming apparatus 10 in the exemplary embodiment is described. As illustrated in FIG. 10, in the image forming apparatus 10 in the exemplary embodiment, two operation modes, that is, an initial registration mode and a restriction mode are set as the operation modes at the time of registration of destination data.

The initial registration mode is an operation mode that allows registration of both destination data via the old specification IF and destination data via the new specification IF, that is, both old specification-compliant destination data and new specification-compliant destination data.

The restriction mode is an operation mode that prohibits the registration of destination data via the old specification IF, and allows the registration of destination data via the new specification IF only. It is to be noted that when a particular operation is performed in the restriction mode, registration of destination data via the old specification IF may be allowed.

It is to be noted that in the image forming apparatus 10, the restriction mode is set as an initial operation mode.

Figure 11:
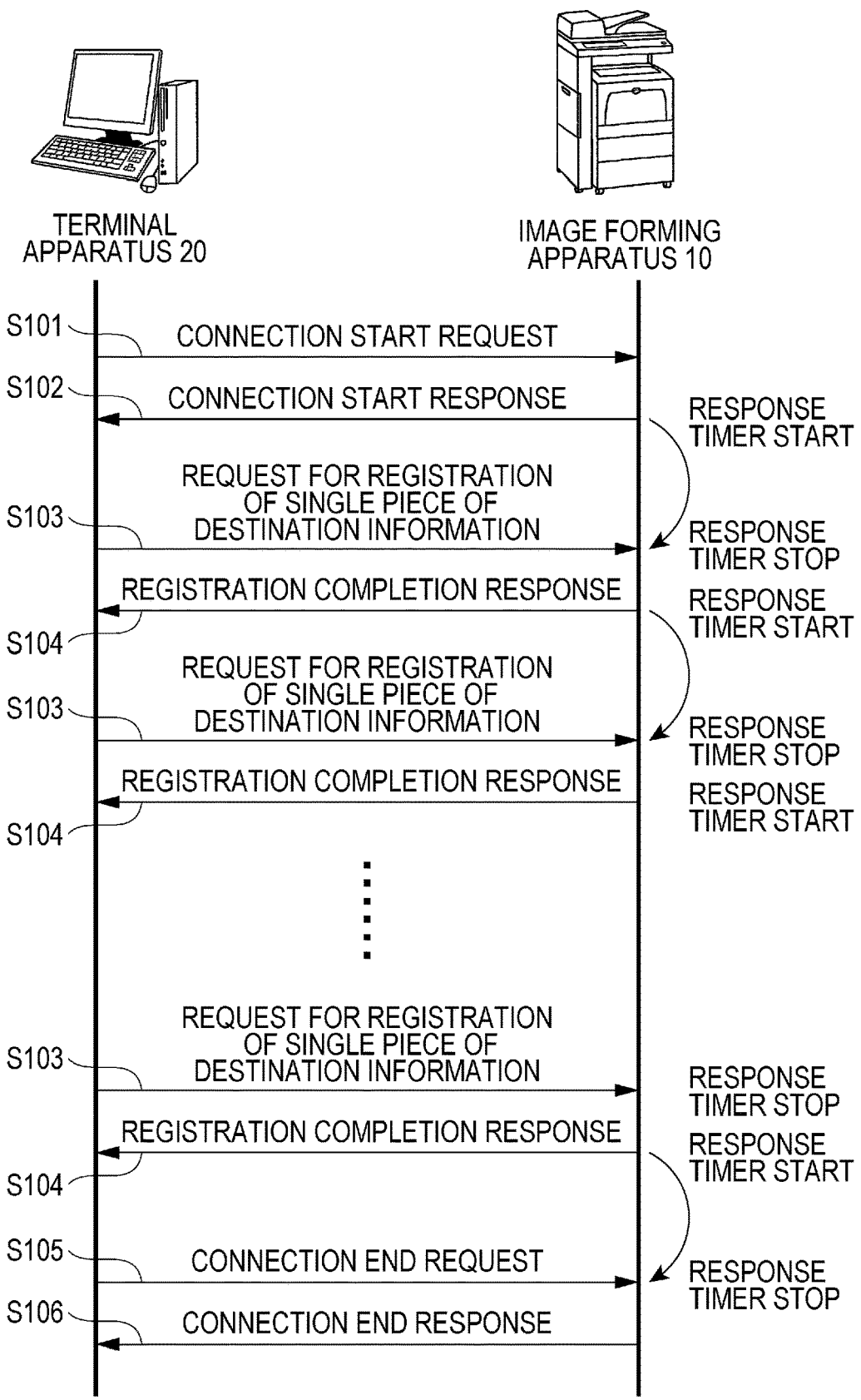
FIG. 11 is a sequence chart for illustrating the operation when destination data is registered in the image forming apparatus from the terminal apparatus.

Next, the operation at the time of registration of destination data from the terminal apparatus 20 to the image forming apparatus 10 will be described with reference to the sequence chart of FIG. 11.

First, in step S101, when the terminal apparatus 20 transmits a connection start request for registration of destination data to the image forming apparatus 10, in step S102, the image forming apparatus 10 sets the operation mode to the initial registration mode or the restriction mode based on the connection start request, and transmits a connection start response back to the terminal apparatus 20.

In step S103, when the terminal apparatus 20 makes a request for registration of a single piece of destination information to the image forming apparatus 10, in step S104, the image forming apparatus 10 registers the single piece of destination information, then transmits a registration completion response back to the terminal apparatus 20. Then, registration of destination information from the terminal apparatus 20 to the image forming apparatus 10 is performed one piece by one piece by similar processing.

Lastly, when registration of all destination information is completed, in step S105, the terminal apparatus 20 makes a connection end request to the image forming apparatus 10. Then, the image forming apparatus 10 ends the registration processing, sets the operation mode to the restriction mode, then, in step S106, transmits a connection end response back to the terminal apparatus 20, and ends all the processing.

After the connection start response illustrated in step S102 or after the registration completion response illustrated in step 104, the image forming apparatus 10 starts a response timer. Then, the image forming apparatus 10 performs processing to stop the response timer when request for registration of destination information is received from the terminal apparatus 20 in step S103 or when the connection end request is received in step S105. When the timer value of the timer exceeds a predetermined time, for instance, five seconds, processing to set the operation mode to the restriction mode is performed in the image forming apparatus 10.

In other words, even if the operation mode is the initial registration mode, when a predetermined time elapses since completion of registration processing of a single piece of destination information until a request for registration of the next piece of destination information is made, the operation mode is changed to the restriction mode, and registration of old specification-compliant destination data is prohibited.

Figure 12:
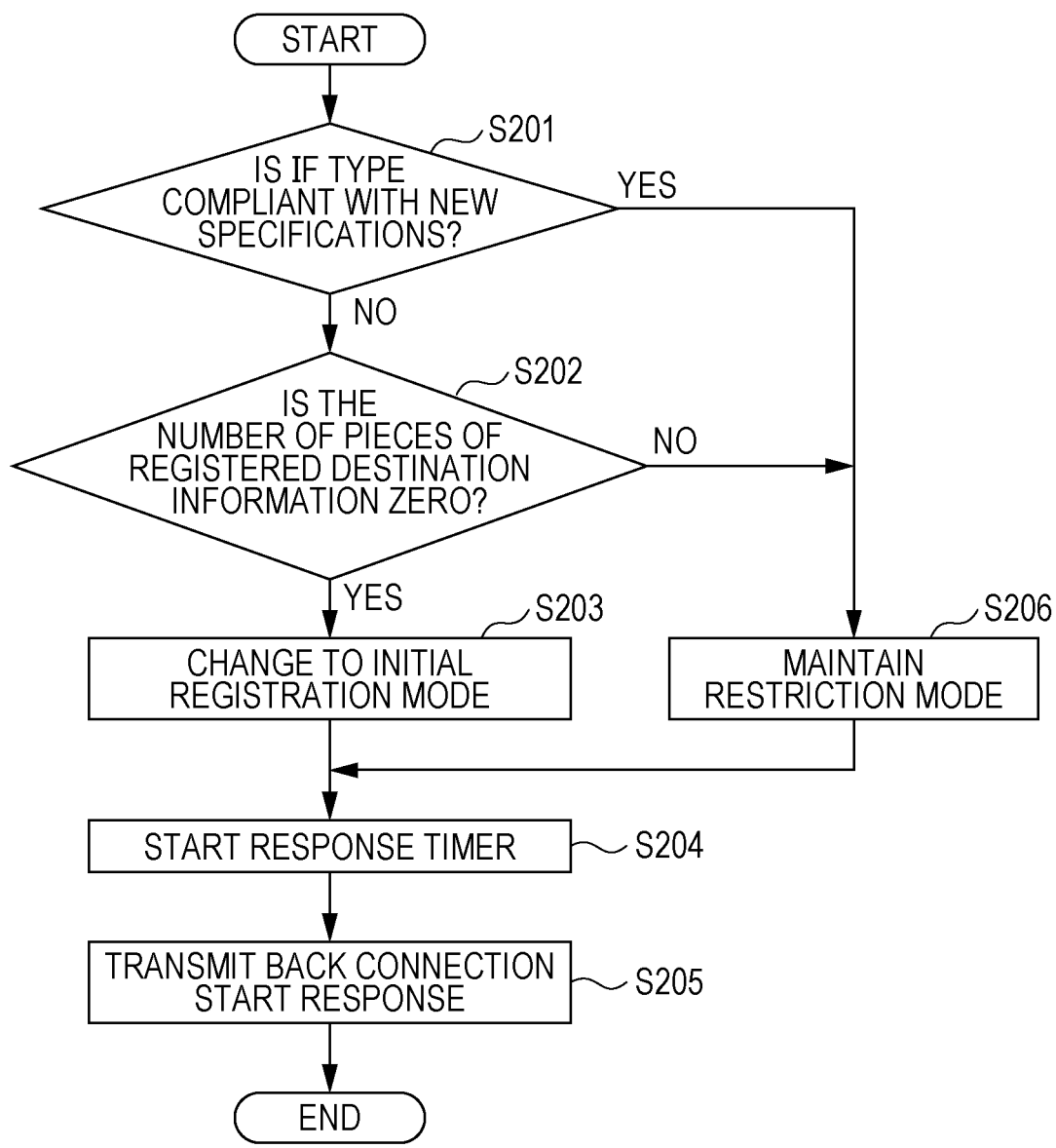
FIG. 12 is a flowchart for illustrating the operation of the image forming apparatus when receiving a connection start request shown in step S101 of the sequence chart of FIG. 11.

Next, the operation of the image forming apparatus 10 when receiving the connection start request illustrated in step S101 of the sequence chart of FIG. 11 will be described with reference to the flowchart of FIG. 12. It is to be noted that in the image forming apparatus 10, the restriction mode is set as the operation mode in the initial state. Thus, when the image forming apparatus 10 receives a connection start request from the terminal apparatus 20, the operation mode is the restriction mode.

In such a state, in the image forming apparatus 10 that receives a connection start request from the terminal apparatus 20, in step S201, the data transmission-reception management controller 36 determines whether or not the type of an IF, via which the connection start request is transmitted by the terminal apparatus 20, is a new specification IF.

When determining that the type of an IF, via which the connection start request is transmitted, is not a new specification IF, that is, an old specification IF In step S201, the data transmission-reception management controller 36 determines whether or not the number of pieces of registered destination information stored in the destination data storage 38 is zero in step S202.

When the number of pieces of registered destination information is determined to be zero in step S202, the data transmission-reception management controller 36 changes the operation mode to the initial registration mode in step S203.

When the type of an IF, via which the connection start request is transmitted, is determined to be a new specification IF in step S201 or the number of pieces of registered destination information is determined to be one or greater in step S202, the data transmission-reception management controller 36 maintains the operation mode as it is at the restriction mode.

In step S204, the data transmission-reception management controller 36 starts the response timer, and transmits a connection start response to the terminal apparatus 20 in step S205.

Figure 13:
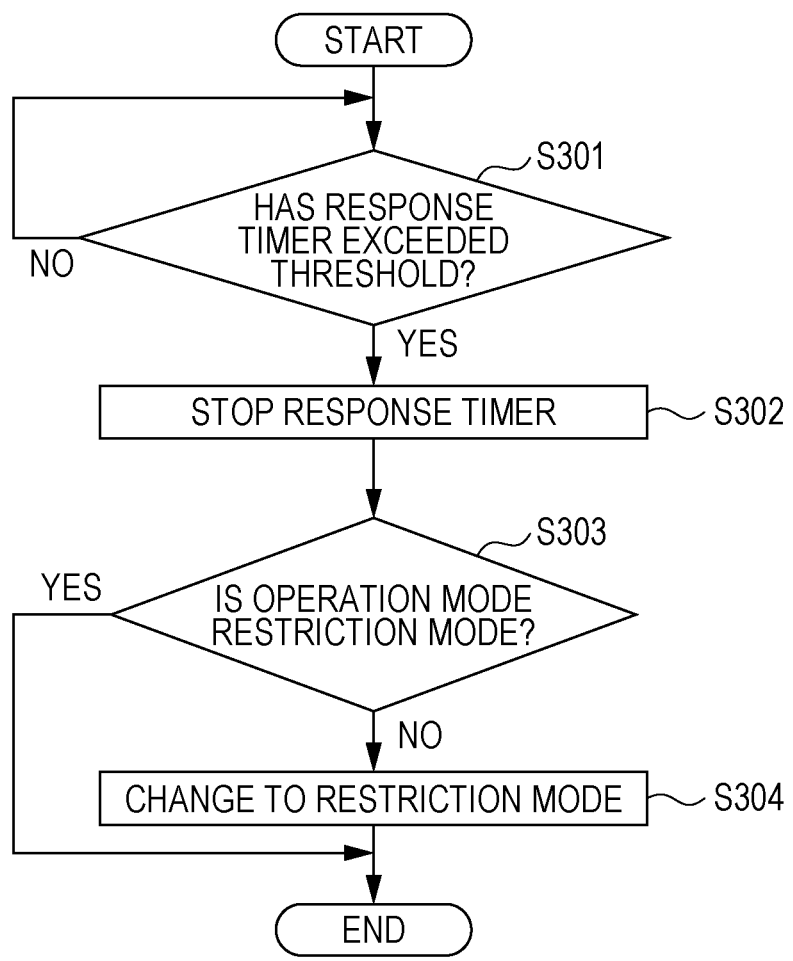
FIG. 13 is a flowchart for illustrating the processing performed when a response timer exceeds a threshold.

Next, the processing performed when the timer value of the response timer exceeds a predetermined time, in short, the response timer exceeds a threshold will be described with reference to the flowchart of FIG. 13.

When the response timer exceeds a threshold in step S301, the data transmission-reception management controller 36 stops the response timer in step S302.

In step S303, the data transmission-reception management controller 36 determines whether or not the current operation mode is the restriction mode.

When the current operation mode is determined to be not the restriction mode, in other words, determined to be the initial registration mode in step S303, the data transmission-reception management controller 36 changes the operation mode to the restriction mode in step S304.

When the current operation mode is determined to be the restriction mode in step S303, the data transmission-reception management controller 36 maintains the current operation mode as it is at the restriction mode.

By performing such processing, when the response timer exceeds a threshold in the operation mode of the initial registration mode, the operation mode is changed to the restriction mode.

Figure 14:
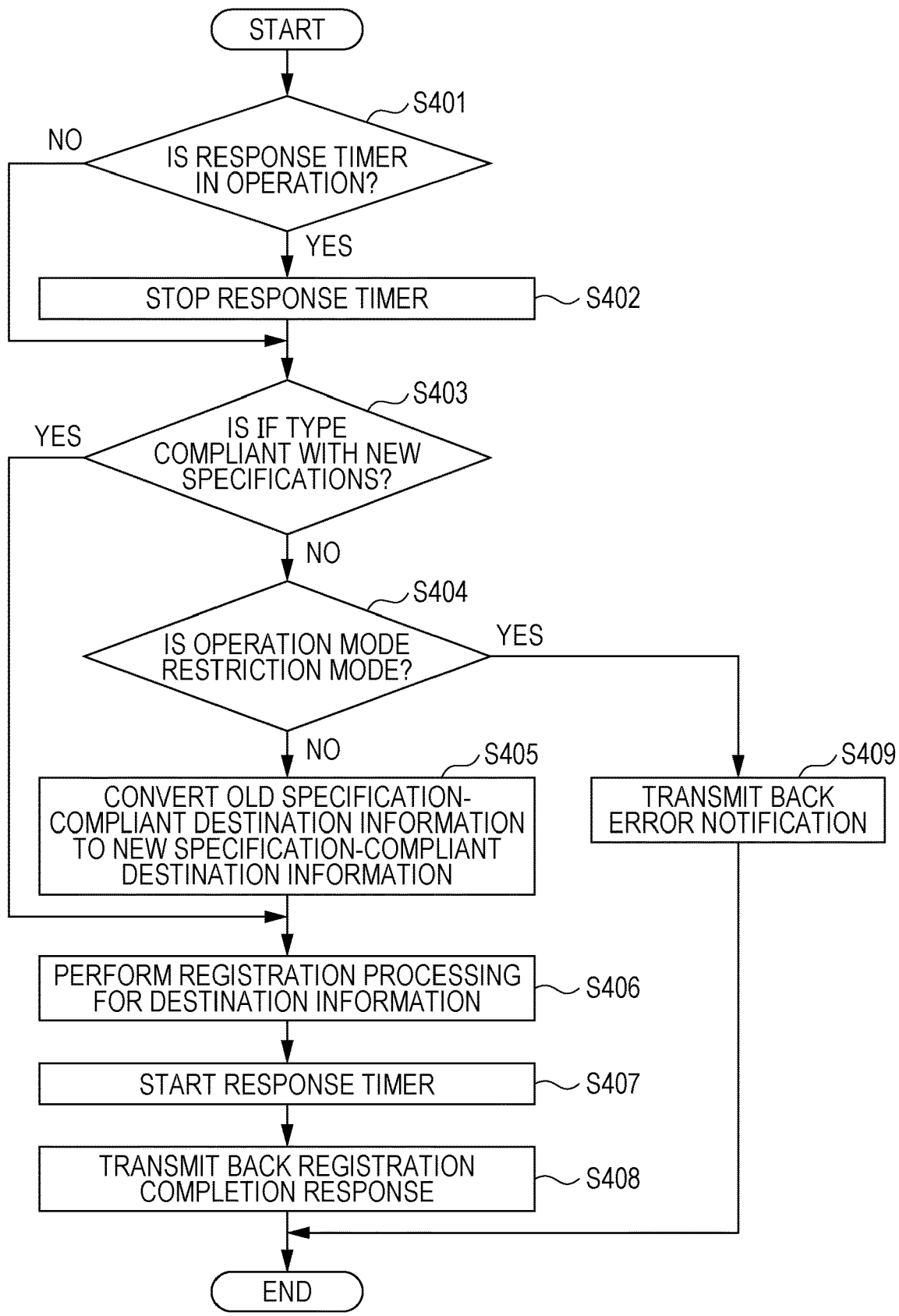
FIG. 14 is a flowchart for illustrating the operation of the image forming apparatus when receiving a registration request from the terminal apparatus shown in step S103 of the sequence chart of FIG. 11.

Next, the operation of the image forming apparatus 10 when receiving a registration request illustrated in step S103 of the sequence chart of FIG. 11 from the terminal apparatus 20 will be described with reference to the flowchart of FIG. 14.

In the image forming apparatus 10 that has received a registration request from the terminal apparatus 20, the data transmission-reception management controller 36 determines whether or not the response timer is in operation in step S401, and when in operation, stops the response timer in step S402.

In step S403, the data transmission-reception management controller 36 determines whether or not the type of an IF, via which the registration request is transmitted by the terminal apparatus 20, is a new specification IF.

When the type of an IF, via which the registration request is transmitted, is determined to be not a new specification IF, that is, determined to be an old specification IF in step S403, the data transmission-reception management controller 36 determines whether or not the current operation mode is the restriction mode in step S404.

When the current operation mode is determined to be not the restriction mode, that is, determined to be the initial registration mode in step S404, the data transmission-reception management controller 36 performs processing to convert the old specification-compliant destination information, transmitted along with the registration request into new specification-compliant destination information in step S405 by the conversion processing unit 37.

When the current operation mode is determined to be the restriction mode in step S404, the data transmission-reception management controller 36 transmits an error notification back to the terminal apparatus 20 in step S409, the error notification indicating that registration processing for destination information in response to received registration request is unable to be performed.

Figure 15:
FIG. 15 is a screen for illustrating an example of an error notification transmitted back to the terminal apparatus.

FIG. 15 illustrates an example of error notification transmitted back to the terminal apparatus 20 in this manner. Referring to FIG. 15, it is seen that a case is illustrated in which the error notification is displayed on the terminal apparatus 20, and the characters, "DESTINATION DATA WITH REGISTRATION REQUEST RECEIVED CANNOT BE REGISTERED BECAUSE THE DATA IS IN COMPLIANT WITH OLD SPECIFICATION AND DESTINATION INFORMATION IS ALREADY REGISTERED" are displayed.

In step S406, the data transmission-reception management controller 36 performs registration processing to store the destination data converted to the new specifications by the conversion processing unit 37 into the destination data storage 38.

When the type of an IF, via which the registration request is transmitted, is determined to be a new specification IF in step S403, the data transmission-reception management controller 36 performs registration processing to store the new specification-compliant destination information, transmitted along with the registration request into the destination data storage 38 as it is in step S406.

The data transmission-reception management controller 36 then starts the response timer in step S407, and transmits a registration completion response back to the terminal apparatus 20 in step S408.

Figure 16:
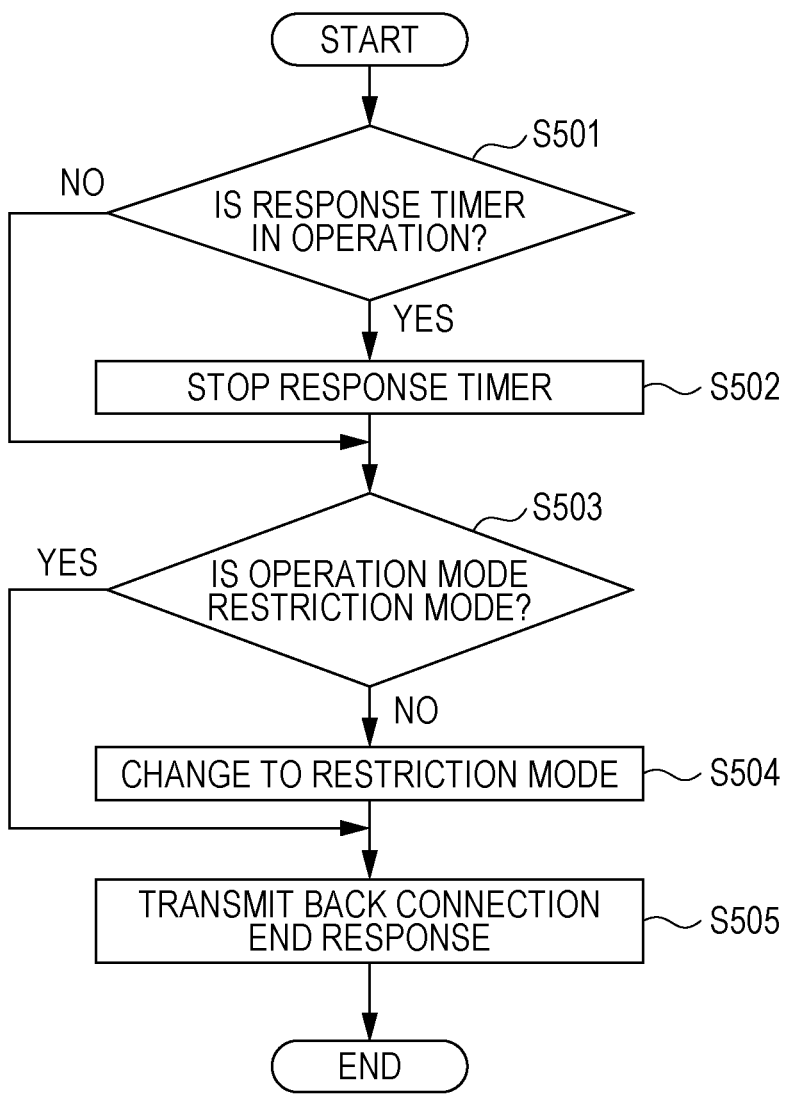
FIG. 16 is a flowchart for illustrating the operation of the image forming apparatus when receiving a connection end request from the terminal apparatus shown in step S105 of the sequence chart of FIG. 11.

Next, the operation of the image forming apparatus 10 when receiving a connection end request illustrated in step S105 of the sequence chart of FIG. 11 from the terminal apparatus 20 will be described with reference to the flowchart of FIG. 16.

In the image forming apparatus 10 that has received a connection end request from the terminal apparatus 20, the data transmission-reception management controller 36 determines whether or not the response timer is in operation in step S501, and when in operation, stops the response timer in step S502.

In step S503, the data transmission-reception management controller 36 determines whether or not the current operation mode is the restriction mode.

When the current operation mode is determined to be not the restriction mode, that is, determined to be the initial registration mode in step S503, the data transmission-reception management controller 36 changes the operation mode to the restriction mode in step S504.

When the current operation mode is determined to be the restriction mode in step S503, the data transmission-reception management controller 36 maintains the current operation mode as it is at the restriction mode.

Lastly, in step S505, the data transmission-reception management controller 36 transmits a connection end response to the terminal apparatus 20.

Figure 17:
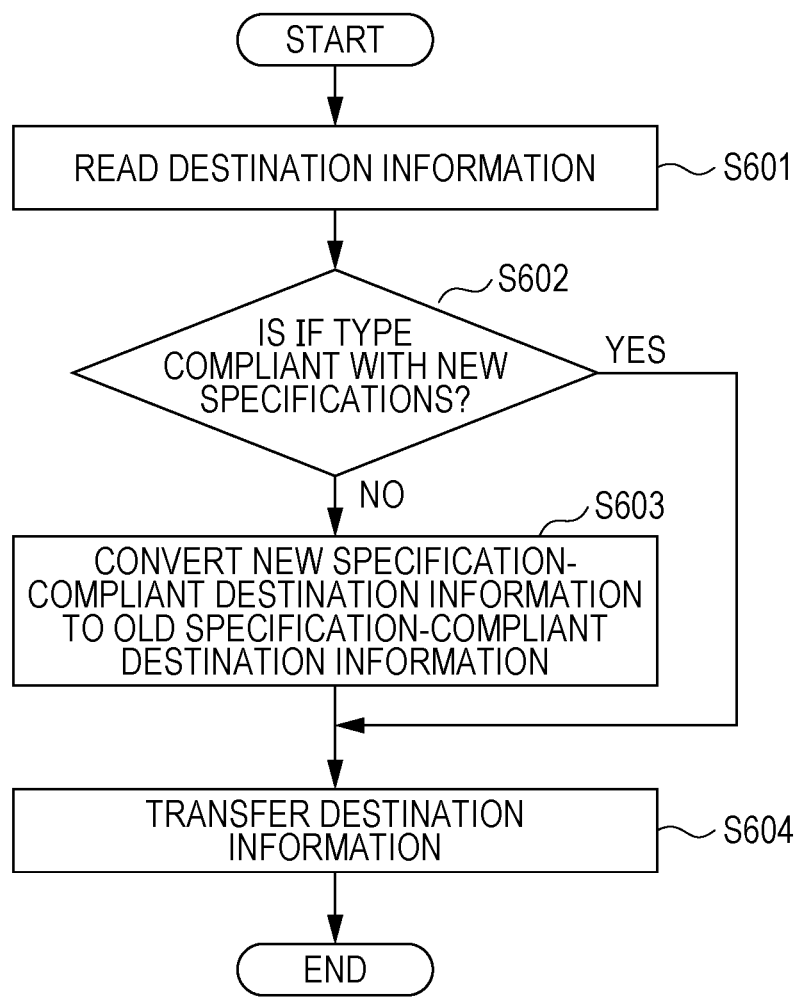
FIG. 17 is a flowchart for illustrating the processing performed when the image forming apparatus receives a destination data read request from the terminal apparatus.

Next, the processing performed when the image forming apparatus 10 receives a destination data read request from the terminal apparatus 20 will be described with reference to the flowchart of FIG. 17.

When the image forming apparatus 10 receives a destination data read request from the terminal apparatus 20, in step S601, the data transmission-reception management controller 36 reads destination information for the received read request from the destination data storage 38.

In step S602, the data transmission-reception management controller 36 determines whether or not the specifications of a communication IF, via which the read request is transmitted, are new specifications.

When the specifications of a communication IF, via which the read request is transmitted, are determined to be not new specifications, that is, determined to be old specifications in step S602, the data transmission-reception management controller 36 converts the read new specification-compliant destination information to the old specifications in step S603.

In step S604, the data transmission-reception management controller 36 transmits the destination information converted to the old specifications to the terminal apparatus 20. When the specifications of the communication IF, via which the read request is transmitted, are determined to be new specifications in step S602, the data transmission-reception management controller 36 transmits the read new specification-compliant destination data as it is to the apparatus that has transmitted the read request.

Even when the operation mode is the restriction mode, old specification-compliant destination data may be read via the old specification IF. However, transfer of the read destination data to another apparatus is prohibited operationally.

In the image forming apparatus 10 in the exemplary embodiment, in a state where even a single piece of destination information is not yet registered, even when the destination data 50 transmitted from the terminal apparatus 20 is compliant with the old specifications, registration processing for the destination data 50 may be performed. Specifically, when the image forming apparatus 10 is newly purchased and replaced by the image forming apparatus 40 used so far, the old specification-compliant destination data 50 read from the image forming apparatus 40 may be registered in the image forming apparatus 10.

However, after at least one piece of destination information is registered in the image forming apparatus 10, even when the old specification-compliant destination data is attempted to be registered in the image forming apparatus 10, the registration processing is not allowed to be performed.

According to the exemplary embodiment, old specification-compliant destination data may be registered only first one time in the image forming apparatus 10 as a new apparatus. Even after destination data is registered in the image forming apparatus 10, in a state where all the destination data is deleted, and the number of pieces of registered destination information is zero, old specification-compliant destination data may be registered.

According to the exemplary embodiment, before old specification-compliant destination data is registered in the image forming apparatus 10, the number of pieces of registered destination information is zero, thus no problem occurs in the registered destination information.

Although the case has been primarily described, in which destination data as an example of setting data is transferred, the setting data is not limited to the destination data, similar processing is applicable when authentication information, authorization information of each user, individual information such as arrangement information of icons on the operation panel, and setting data such as setting values in various functions such as copy setting, scan setting, and FAX setting are transferred.

In the embodiment above, the term "processor" refers to hardware in a broad sense. Examples of the processor includes general processors (e.g., CPU: Central Processing Unit), dedicated processors (e.g., GPU: Graphics Processing Unit, ASIC: Application Integrated Circuit, FPGA: Field Programmable Gate Array, and programmable logic device).

In the embodiment above, the term "processor" is broad enough to encompass one processor or plural processors in collaboration which are located physically apart from each other but may work cooperatively. The order of operations of the processor is not limited to one described in the embodiment above, and may be changed.

Modification

In the exemplary embodiment, a description has been given using an example in which setting data, such as destination data, is registered in the image forming apparatus. However, the present disclosure is not limited to this, and the present disclosure is similarly applicable even when setting data is registered in an information processing apparatus other than the image forming apparatus, for instance, various information processing apparatuses, such as a personal computer and a smartphone.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising;
a memory; and
a processor configured to:
  receive setting data that is used for an operation of the information processing apparatus;
  determine whether the received setting data is formatted according to an old specification;
  determine whether the information processing apparatus has no setting data currently registered;
  upon a determination that the received setting data is formatted according to the old specification and the information processing apparatus has no setting data registered, convert and store the received setting data in a new format in the memory; and
  upon a determination that the information processing apparatus has at least one piece of setting data corresponding to the received setting data already currently registered, prohibit the received setting data from being stored in the new format in the memory.

2. The information processing apparatus according to claim 1, wherein:
the setting data includes a plurality of pieces of individual data, and
the converting and the storing of the setting data is performed upon a determination that the information processing apparatus has no piece of individual data registered.

3. The information processing apparatus according to claim 2, wherein the setting data is destination data.

4. The information processing apparatus according to claim 1, wherein
the setting data includes a plurality of pieces of individual data, and the processor is configured to, in response to reception of a first registration request for a first piece of the plurality of pieces of individual data and reception of a second registration request for a second, subsequent piece of the plurality of pieces of individual data being made within a predetermined time, handle the first piece and the second piece as a series of setting data, and
register the series of setting data upon a determination that the information processing apparatus has no setting data registered at a start of the registration of the series of setting data.

5. The information processing apparatus according to claim 4, wherein the processor is configured to:
start a timer after completion of the registration of the first piece, and
in response to a value of the timer at the reception of the second registration request for the second piece being less than or equal to a predetermined time, handle the first piece and the second piece as the series of setting data.

6. A non-transitory computer readable medium storing a program causing a computer to execute a process comprising:
receiving setting data that is used for an operation of an information processing apparatus;
determining whether the received setting data is formatted according to an old specification;
  determining whether the information processing apparatus has no setting data currently registered;
upon a determination that the received setting data is formatted according to the old specification and the information processing apparatus has no setting data registered, converting and storing the received setting data in a new format in a memory; and
upon a determination that the information processing apparatus has at least one piece of setting data corresponding to the received setting data already currently registered, prohibiting the received setting data from being stored in the new format in the memory.

7. An information processing apparatus comprising:
a memory;
means for receiving setting data that is used for an operation of the information processing apparatus;
means for determining whether the received setting data is formatted according to an old specification;
means for determining whether the information processing apparatus has no setting data currently registered;
means for, upon a determination that the received setting data is formatted according to the old specification and the information processing apparatus has no setting data registered, converting and storing the received setting data in a new format in the memory; and
means for, upon a determination that the information processing apparatus has at least one piece of setting data corresponding to the received setting data already currently registered, prohibiting the received setting data from being stored in the new format in the memory.

* * * * *